(12) United States Patent
Watanabe

(10) Patent No.: US 11,788,862 B2
(45) Date of Patent: Oct. 17, 2023

(54) MAP DATA GENERATION APPARATUS

(71) Applicant: DENSO CORPORATION, Kariya (JP)

(72) Inventor: Hirohisa Watanabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 136 days.

(21) Appl. No.: 17/547,546

(22) Filed: Dec. 10, 2021

(65) Prior Publication Data

US 2022/0099458 A1  Mar. 31, 2022

Related U.S. Application Data

(63) Continuation of application No. PCT/JP2020/021385, filed on May 29, 2020.

(30) Foreign Application Priority Data

Jun. 12, 2019  (JP) .................................. 2019-109653

(51) Int. Cl.
  *G01C 21/00*   (2006.01)
  *B60W 50/029*  (2012.01)

(52) U.S. Cl.
  CPC ....... *G01C 21/3841* (2020.08); *B60W 50/029* (2013.01); *G01C 21/3815* (2020.08); *G01C 21/3881* (2020.08); *B60W 2050/0297* (2013.01)

(58) Field of Classification Search
  CPC ............ G01C 21/3841; G01C 21/3815; G01C 21/3881; B60W 50/029; B60W 2050/0297

See application file for complete search history.

(56) References Cited

U.S. PATENT DOCUMENTS 7,577,520 B2 *  8/2009  Nomura ............. G01C 21/3896
                                                     701/453
7,710,421 B2 *  5/2010  Muramatsu ........ G01C 21/3896
                                                     701/1

(Continued)

FOREIGN PATENT DOCUMENTS

JP   2005-062854 A    3/2005
JP   2016-180980 A   10/2016

(Continued)

OTHER PUBLICATIONS

U.S. Appl. No. 17/547,619, filed Dec. 10, 2021, Watanabe, Hirohisa.

*Primary Examiner* — Gertrude Arthur Jeanglaude
(74) *Attorney, Agent, or Firm* — Harness, Dickey & Pierce, P.L.C.

(57) ABSTRACT

A map data generation apparatus is provided as follows. Probe data are collected from a plurality of vehicles. An integration process is performed to generate an integrated map data by integrating the collected probe data for each of data management units corresponding to (i) road sections, (ii) road links, or (iii) meshes into which a map is divided. A comparison process is performed to obtain a difference by comparing the generated integrated map data with a basic map data. The basic map data is updated based on the obtained difference. The integrated map data for a first data management unit is generated in response to a required number of the probe data being collected for the first data management unit. The required number of the probe data is set depending on a road type in the first data management unit.

23 Claims, 5 Drawing Sheets

(56) References Cited

U.S. PATENT DOCUMENTS

| | | | | |
|---|---|---|---|---|
| 2016/0047658 A1* | 2/2016 | Nishide | ............... | G01C 21/26 |
| | | | | 701/532 |
| 2016/0282127 A1* | 9/2016 | Goto | ............... | G01S 5/0027 |
| 2017/0122749 A1 | 5/2017 | Urano et al. | | |
| 2018/0225962 A1* | 8/2018 | Nakamura | ............ | G08G 1/065 |
| 2020/0263993 A1* | 8/2020 | Gaal | ............... | G01C 21/3691 |
| 2021/0199437 A1 | 7/2021 | Breed et al. | | |

FOREIGN PATENT DOCUMENTS

| | | |
|---|---|---|
| JP | 2017-090121 A | 5/2017 |
| JP | 2017-090548 A | 5/2017 |
| JP | 2019-508677 A | 3/2019 |

* cited by examiner

MAP DATA GENERATION APPARATUS

CROSS REFERENCE TO RELATED APPLICATIONS

The present application is a continuation application of International Patent Application No. PCT/JP2020/021385 filed on May 29, 2020, which designated the U.S. and claims the benefit of priority from Japanese Patent Application No. 2019-109653 filed on Jun. 12, 2019. The entire disclosures of all of the above applications are incorporated herein by reference.

TECHNICAL FIELD

The present disclosure relates to a map data generation apparatus that generates and updates map data based on probe data collected from a plurality of vehicles.

BACKGROUND

For example, as a technology for generating a digital road map used for a car navigation apparatus or automatic driving control, a system that generates/updates map data based on probe data collected from a plurality of probe cars can be considered. In this system, a plurality of vehicles, which are probe cars, are communicably connected to the center, and the center collects, as probe data, vehicle traveling position data obtained over time from GPS as each vehicle travels. Then, the center reproduces the traveling locus of each road from the probe data and updates the map data based on the difference detected from the map data in the database.

SUMMARY

According to an example of the present disclosure, a map data generation apparatus is provided as follows. Probe data are collected from a plurality of vehicles. An integration process is performed to generate an integrated map data by integrating the collected probe data for each of data management units corresponding to (i) road sections, (ii) road links, or (iii) meshes into which a map is divided. A comparison process is performed to obtain a difference by comparing the generated integrated map data with a basic map data. The basic map data is updated based on the obtained difference. The integrated map data for a first data management unit is generated in response to a required number of the probe data being collected for the first data management unit. The required number of the probe data is set depending on a road type in the first data management unit.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

(1) First Embodiment

Figure 1:
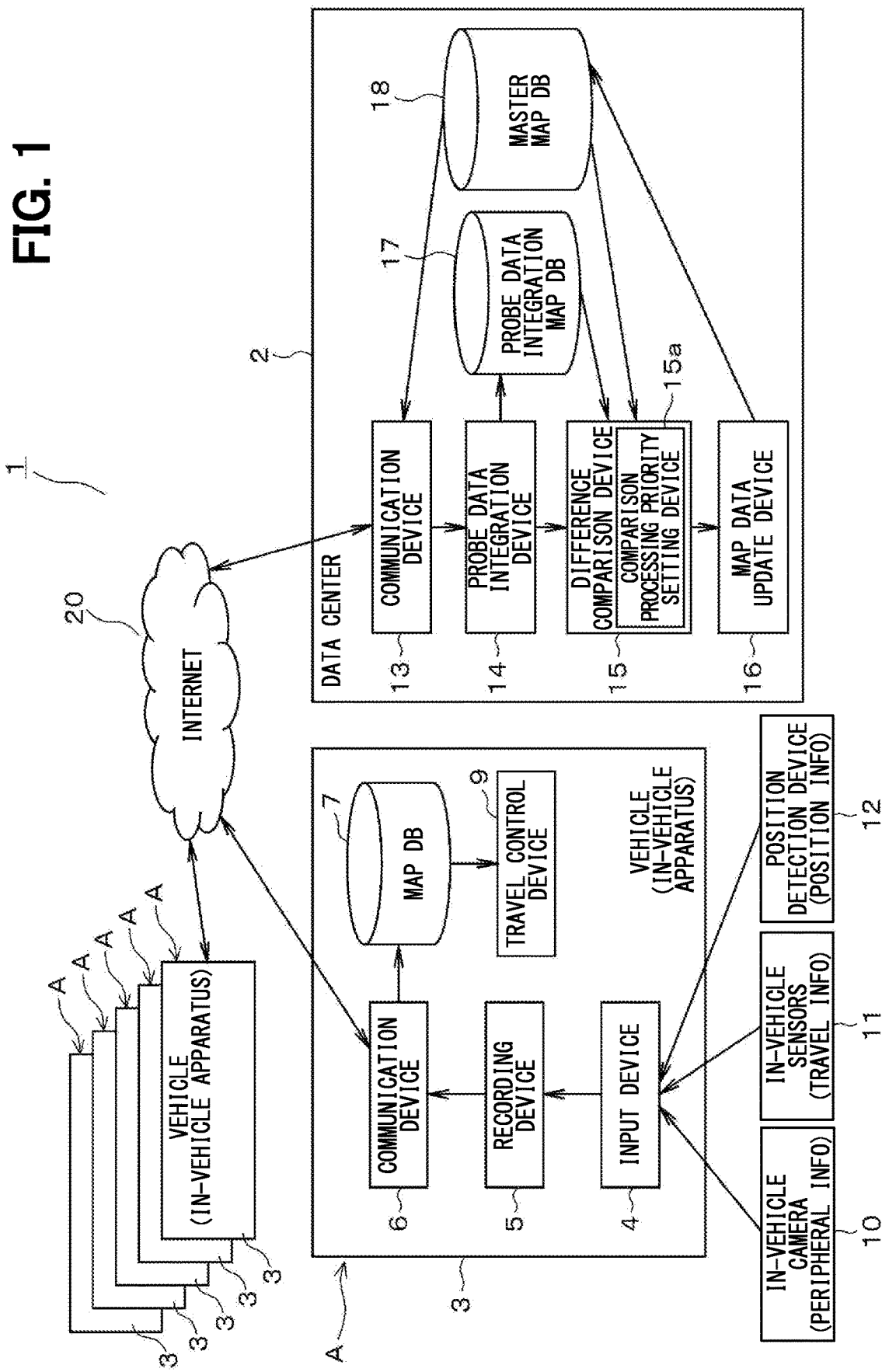
FIG. 1 is a block diagram schematically showing an overall configuration of a map generation system according to a first embodiment.

Hereinafter, a first embodiment describing the present disclosure will be described with reference to FIGS. 1 to 3. In this first embodiment, a road section or road link is used as a data management unit for integrating/updating map data. FIG. 1 schematically shows the overall configuration of a map generation system 1. Here, the map generation system 1 includes a data center 2 and a vehicle group A of a plurality of vehicles A traveling on roads. Specifically, the vehicle group A include a whole of general automobiles such as a passenger car and a truck. The data center 2 functions as a map data generation apparatus according to the present embodiment. The map data generation apparatus collects probe data from a large number of vehicles A and generates/updates a road map data.

Each vehicle A is equipped with an in-vehicle apparatus 3 for realizing the road map generation system 1. The in-vehicle apparatus 3 includes a computer, its peripheral apparatuses, and a wireless communication apparatus. Using such hardware and software configurations, the in-vehicle apparatus 3 includes an input device 4 for inputting various information as probe data, a recording device 5 for recording the input data, a communication device 6, a map database 7, and a travel control device 9. Note that the input device 4, the recording device 5, and the travel control device 9 may be included in a controller included in the computer in the in-vehicle apparatus 3.

The input device 4 is connected with the in-vehicle camera 10. The input device 4 receives camera image information, that is, peripheral information taken by the in-vehicle camera 10 while the vehicle A is traveling. A wide-angle camera is adopted as the in-vehicle camera 10, and is provided, for example, on the front and rear and left and right of the vehicle A. The in-vehicle camera 10 may have a function at least to capture an image of the front of the vehicle A.

Further, traveling information from various in-vehicle sensors 11 is input to the input device 4. The various in-vehicle sensors 11 include a speed sensor that detects the speed of the host vehicle, and a direction sensor that detects the traveling direction, that is, the direction of the host vehicle. Further, the vehicle position information from the position detection device 12 is input to the input device 4. The position detection device 12 detects the position of the host vehicle based on the reception data of a well-known GPS receiver and the like. In this way, the camera image information on the surroundings of the vehicle A, the traveling information on the vehicle A, and the position information on the vehicle A when the vehicle A is traveling are input to the input device 4. Such information is recorded in the recording device 5 as probe data together with date and time data.

The communication device 6, which may also be referred to as a wireless transceiver 6, communicates with the data center 2 via a mobile communication network, the Internet 20, or the like. In this case, the probe data recorded in the recording device 5 is transmitted to the data center 2 by the communication device 6 periodically, for example, once a day. Further, the map database 7 stores, for example, road map information nationwide. In this case, the latest map data is distributed and updated from the data center 2 to the map database 7 via the communication device 6. The travel control device 9 uses the road map data stored in the map database 7 to perform a vehicle control such as an accelerator, a brake, and a steering wheel to realize automatic driving and the like.

In contrast, the data center 2 includes a server computer and its peripheral apparatuses, a large-capacity storage device, a wireless communication device, and the like. With such hardware and software configurations, the data center 2 includes a communication device 13, a probe data integration device 14 as an integration processing device 14, a difference comparison device 15 as a comparison processing device 15, and a map data update device 16 while including a probe data integrated map database 17 and a master map database 18. In this case, a high-precision basic map data that can be used for an automatic driving control of the vehicle A is generated and stored in the master map database 18. Then, the high-precision basic map data stored in the master map database 18 is also distributed to each vehicle A; the equivalent data is stored in the map database 7 in the in-vehicle apparatus 3 in the vehicle A. Note that, the probe data integration device 14, the difference comparison device 15, and the map data update device 16 may be included in a controller included in the sever computer in the data center 2.

The communication device 13, which may also referred to as a transceiver 13, performs data communication with the in-vehicle apparatus 3 in each vehicle A via the Internet 20 or the like, and receives probe data transmitted from a large number of in-vehicle apparatuses 3. Therefore, the communication device 13 realizes the function as the probe data collection device. In this case, probe data will be collected from, for example, general vehicles A traveling all over Japan. It is predicted that there will be millions of vehicles A capable of acquiring and transmitting probe data in the future, and a huge amount of probe data will be collected from these vehicles A.

The probe data integration device 14 integrates a large number of probe data collected via the communication device 13 to generate an integrated map data. The generated integrated map data is written in the probe data integrated map database 17. In this case, as will be described in detail later, the probe data integration device 14 is configured to generate an integrated map data when a required number of probe data are collected for each road section or road link as a data management unit. The required number of probe data is set at least depending on a road type in the corresponding data management unit.

Specifically, the road type referred to here is a type such as a high-speed automobile national road, a general national road, a prefectural road, and a municipal road. For example, the required number is 10 fora high-speed automobile national road, 12 for a general national road, 14 for a prefectural road, 16 for a municipal road, and so on. Further, in the present embodiment, the required number of probe data varies depending on the number of landmarks or the density of landmarks in a road section or road link in the corresponding data management unit. In this case, when the number of landmarks or the density of landmarks is large, the required number can be reduced as compared with the case where the number of landmarks is small, for example, the required number can be reduced by 2.

The difference comparison device 15 compares the integrated map data integrated by the probe data integration device 14 with the basic map data stored in the master map database 18 to obtain a difference. Then, the difference is obtained by the difference comparison device 15; namely, a change in the shape of the road, an increase or decrease in the number of lanes, or the like is confirmed. The map data update device 16 thereby updates the basic map data stored in the master map database 18. Further, when the basic map data is updated, the communication device 13 transmits the latest updated map data to the in-vehicle apparatus 3 in each vehicle A.

In this case, as will be described in detail later, when the difference comparison device 15 performs the comparison process between the integrated map data and the basic map data, the difference comparison device 15 sets the priorities in the comparison process respectively for road sections or road links as data management units. Then, the difference comparison device 15 performs the comparison process for obtaining the difference in descending order of priorities according to the priorities respectively set for the road sections or the road links. Therefore, the difference comparison device 15 is configured to include the comparison process priority setting device 15*a*. In the present embodiment, the priorities are set by numerical values of 10 levels from 1 to 10, for example, for each road section or road link of roads, and the priority 1 is the highest and the priority 10 is the lowest.

More specifically, in the present embodiment, the basic priority of a road section or road link is set according to a road type. Here, for example, priority 2 is set for a national expressway, priority 4 is set for a general national highway, priority 6 is set for a prefectural road, and priority 8 is set for a municipal road. Further, with respect to such a basic priority set according to a road type, the numerical value of the priority is raised or lowered according to some of the following cases.

For instance, suppose a first case where a predetermined period of time (e.g., one week) elapses while the comparison process by the difference comparison device 15 is not performed to a first road section or road link. In such a first case, the priority is raised by, for example, one level, that is, the numerical value is reduced by one, for the first road section or road link. Further, suppose a second case where a predetermined period of time (e.g., 48 hours) does not elapse since the comparison process by the difference comparison device 15 is performed to a second road section or road link. In such a second case, the priority is lowered by, for example, one level, that is, the numerical value is raised by one, for the second road section or road link. Suppose a third case where an accident has occurred in a third road section or road link (e.g., within one week). In such a third case, the priority is raised by, for example, one level, that is, the numerical value is decreased by one for the third road section or road link.

Suppose a fourth case where a failure in an automatic driving control using the road map data in the vehicle A has occurred in a fourth road section or road link. In such a fourth case, the priority is raised by, for example, one level, that is, the numerical value is reduced by one, for the fourth road section or road link. Suppose a fifth case where a roadwork is known to be carried out in a fifth road section or road link. In such a fifth case, the priority is raised by, for example, one level, that is, the numerical value is reduced by one for the fifth road section or road link from one day before the start of the roadwork to the end of the roadwork. Suppose a sixth case where a sixth road section or road link exists in an area where a disaster such as earthquake, flood, fire or accident has occurred. In such a sixth case, the priority is raised by, for example, two levels, that is, the numerical value is reduced by two for the sixth road section or road link. Suppose a seventh case where there are more than a predetermined number of indications or complaints for a seventh road section or road link from the end user that the map is incorrect. In such a seventh case, the priority is raised by, for example, one level, that is, the numerical value is reduced by one for the seventh road section or road link.

Next, the operation of the data center 2 in the map generation system 1 having the above configuration will be described with reference to FIGS. 2 and 3. As described above, in the data center 2, first, the communication device 13 executes a collection process of receiving probe data from the in-vehicle apparatus 3 in each vehicle A. After that, the probe data integration device 14 executes an integration process of integrating the probe data. Next, the difference comparison device 15 executes a comparison process of comparing the integrated map data and the basic map data to obtain the difference. As a result, when there is a difference, the map data update device 16 executes an update process of updating the basic map data.

Figure 2:
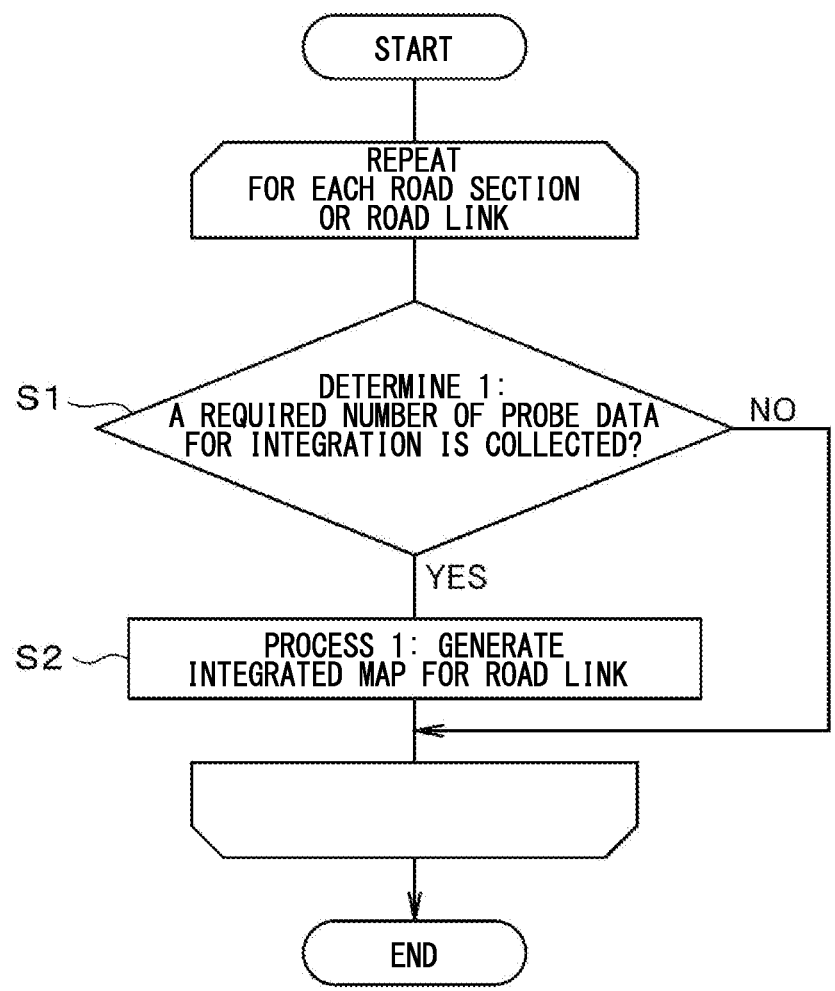
FIG. 2 is a flowchart illustrating steps of processing executed by a probe data integration device.

The flowchart of FIG. 2 schematically shows steps of an integration process of probe data executed by the probe data integration device 14 in the data center 2. That is, in FIG. 2, the processing in steps S1 to S2 is repeatedly executed for each road section or road link. In step S1, it is determined whether or not the number of probe data required for the integration process has been collected for the present road section or road link. If the required number of probe data has been collected (Yes in step S1), the probe data for the present road section or road link are integrated in step S2. The integrated map data is thus generated and written to the probe data integrated map database 17.

When the number of probe data has not reached the required number yet (No in step S1), the integration process is not performed and the process proceeds to the next road section or road link directly. Here, as described above, the number of probe data required for the integration process is predetermined for a respective road section or road link. For example, in the case of the National Expressway, the required number is 10, and the integration process and the subsequent comparison process are performed relatively frequently. In other words, in the case of roads such as municipal roads, the integration process and the comparison process are performed relatively infrequently with intervals. Further, in the present embodiment, the required number may be different even between the road sections or road links having the same road type. That is, the required number is set depending on the number of landmarks or the density of landmarks existing in the corresponding road section or road link. When the number or density of landmarks existing in the road section or road link is relatively large, the required number is reduced as compared with the case where the number or density is small. The integration process and the comparison process are thereby performed more frequently.

Figure 3:
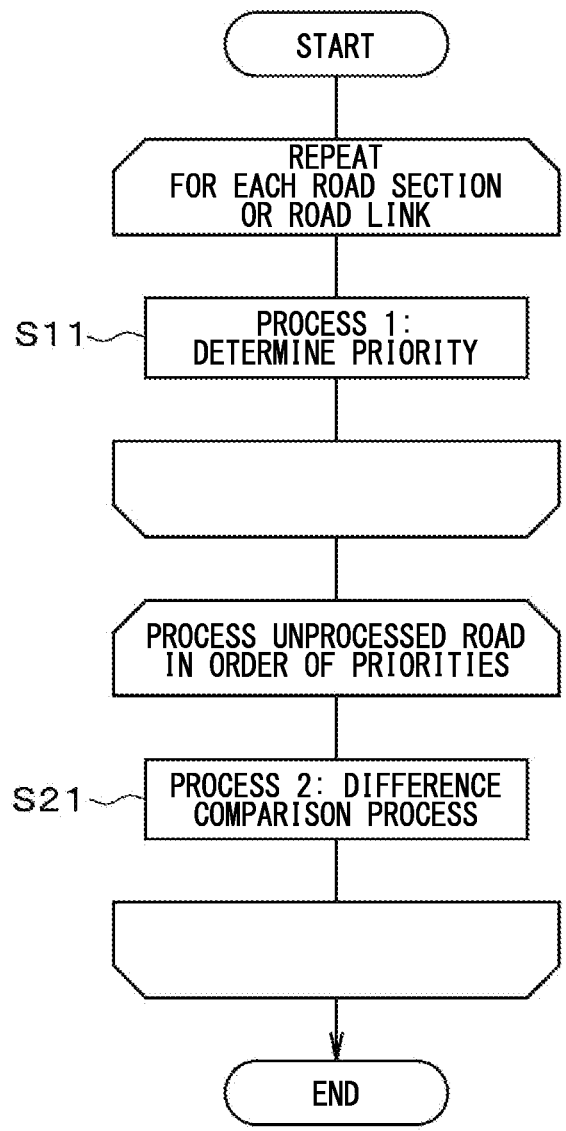
FIG. 3 is a flowchart schematically showing steps of processing executed by a difference comparison device.

Next, the flowchart of FIG. 3 schematically shows steps of a comparison process executed by the difference comparison device 15 in the data center 2. The comparison process is of comparing the probe data integrated map data and the basic map data. In FIG. 3, first, the processing in step S11 is repeatedly executed for each road section or road link. In step S11, the priority for the present road section or road link is set to any one of the ten levels. As described above, the priority is basically set according to the road type. For example, priority 2 is set for a national expressway; priority 4 is set for a general national highway. Further, in the present embodiment, such a basically set priority is changed according to some conditions as follows. That is, when the time during which the comparison process by the difference comparison device 15 is not performed exceeds a predetermined time, for example, one week, the priority is raised by one level. When a certain time, for example, 48 hours has not passed after the comparison process by the difference comparison device 15, the priority is lowered by one level. For a road section or road link where an accident occurred within a week, for instance, the priority is raised by one level. For a road section or road link where a failure in an automatic driving control has occurred, the priority is raised by one level. For a road section or road link that is known to have a roadwork, the priority is raised by one level, for example, from one day before the start of the roadwork to the end of the roadwork. For a road section or road link that exists in an area where a disaster, such as earthquake, flood, fire, accident has occurred, the priority is raised by two levels. When there are more than a predetermined number of indications or complaints from the end user that the map is incorrect, the priority is raised by one level for the corresponding road section or road link.

When the processing of setting the priority is completed in this way, the difference comparison process in the next step S21 is repeatedly executed for each road section or road link in order of priorities from the unprocessed one. In step S21, as described above, the integrated map data integrated by the probe data integration device 14 is compared with the basic map data stored in the master map database 18 to obtain the difference. When the difference is obtained by the difference comparison device 15, that is, when a change in the shape of the road, an increase or decrease in the number of lanes, or the like is confirmed, the basic map data in the master map database 18 is updated.

Although not shown in FIG. 3, another configuration may be provided. That is, in the middle of performing the comparison process for a first road section or road link having a relatively low priority, a second road section or road link having a high priority, for example, a priority of 1, arises. In such a case, the comparison process for the second road section or road link with the higher priority can be executed by interrupting the comparison process for the first road section or road link. Further, in the comparison process by the difference comparison device 15, a plurality of server computers may be provided and the parallel process may be executed according to the load.

As described above, according to the present embodiment, the following effects can be obtained. That is, in the data center 2, probe data are received and collected from the in-vehicle apparatuses 3 in a large number of vehicles A. Based on the collected probe data, the probe data integration device 14 integrates the probe data to generate an integrated map data. Then, the difference comparison device 15 compares the integrated map data with the basic map data to obtain the difference, and the basic map data in the master map database 18 is updated based on the obtained difference. In this case, the probe data integration device 14 is configured to perform the integration process when the required number of probe data are collected, and the required number is set for each road type of the road.

Therefore, for road sections or road links, such as national expressways, where the maintenance of map data is relatively important, the required number should be determined to be relatively small. As a result, the frequency in performing the integration process and the subsequent comparison process becomes relatively high, and it is possible to constantly update to the latest map data. For example, for road sections or road links that are less important, such as municipal roads, the required number should be set large. As a result, the frequency in performing the integration process and the subsequent comparison process can be reduced. As a result, according to the present embodiment, the map data is generated/updated based on the probe data collected from a plurality of vehicles, and a large amount of probe data can be efficiently processed.

Further, in the present embodiment, the required number varies depending on the number of landmarks or the density of landmarks in a road section or road link. Here, a large number of landmarks or a high density of landmarks serve as a reference for position alignment when performing integration process. The road section or road link with a large number or a high density of landmarks can obtain an accurate integrated map data even with a small number of probe data as compared with the case where the number of landmarks is small or the density of landmarks is low. Therefore, the required number is varied depending on the number of landmarks or the density of landmarks. If the number of landmarks is small or the density of landmarks is low, the required number is changed in the direction of increasing. As a result, an accurate integrated map data can be obtained while reducing the frequency in performing the integration process and the subsequent comparison process.

Then, in the present embodiment, when the comparison process is performed by the difference comparison device 15, the priority is set for each road section or road link, and the comparison process for obtaining the difference is performed in descending order of priorities from the highest priority towards the lowest priority. As a result, for a road section or road link with a high priority, the frequency in the comparison process by the difference comparison device 15 becomes relatively high. For a road section or road link with a low priority, the frequency in the comparison process by the difference comparison device 15 can be reduced. As a result, the map data is generated/updated based on the probe data collected from a plurality of vehicles A, and a large amount of probe data can be efficiently processed.

In this case, in the present embodiment, basically, the priority of the road section or the road link is set according to the type of the road. As a result, for example, for a road type with a large amount of automobile traffic and a large amount of map data usage, the priority is raised. By doing so, it is possible to always update the map data as up-to-date as possible. Therefore, the freshness of the map data for the frequently used part can be ensured, which is more effective.

Further, in the present embodiment, such a basically set priority is changed according to some conditions as follows. That is, when the time during which the comparison process by the difference comparison device 15 is not performed exceeds a predetermined time, for example, one week, the priority is raised. As a result, it is possible to prevent the corresponding road section or road link of the road from being processed. In other words, it is possible to prevent the period of time during which the basic map data is not updated with the latest information from becoming too long. The priority is lowered until a certain time elapses since the comparison process by the difference comparison device 15 is performed. As a result, it is possible to avoid a situation in which the comparison process by the difference comparison device 15 is repeatedly and continuously performed for a specific road section or road link. In the meantime, processing for other road sections or road links can be facilitated, and processing can be facilitated effectively as a whole.

The road section or road link where an accident occurred recently may be assumed to have a problem in an original map data, and also assumed to need a subsequent change in the road due to the occurrence of the accident. Therefore, by raising the priority for the road section or road link where the accident occurred, the map data of that road section or road link can be updated promptly. The cause of the accident and the problems associated with the accident can be resolved promptly. In addition, suppose an occurrence of a failure in an automatic driving control. One of the causes for the occurrence of the failure may be a failure in the map data in the corresponding road section or road link. Therefore, by raising the priority of the road section or road link, the map data of the corresponding road section or road link can be quickly updated.

For a road section or road link that is known to be under roadwork, detours may be provided or the road may be closed. Furthermore, after the roadwork, the road may be restored or the road may be changed. In order to deal with such changes, it is desirable that the comparison process by the difference comparison device 15 and the update of the map data are performed frequently. Therefore, by raising the priority, highly effective processing can be performed. A road section or road link that exists in an area where a disaster such as earthquake, flood, fire, accident has occurred may be subject to changes such as impassability. Therefore, by raising the priority for the corresponding road section or road link, it is possible to update the map data promptly in response to the changes in the road conditions due to the disaster. When the end user points out or complains that the map is incorrect, there is a high possibility that the map data of the corresponding road section or road link is incorrect. Therefore, by raising the priority, it is possible to update the map data promptly.

In the present embodiment, another case is provided. That is, suppose a case where while a first road section or road link having a relatively low priority is subjected to the comparison process by the difference comparison device 15, a second road section or road link having a high priority may arise. In such a case, it can be configured to interrupt the processing for the first road section or road link and proceed with the processing for the second road section or road link with the higher priority. Here, for the second road section or road link with high priority, prompt update of map data is required, so effective processing can be performed.

The first embodiment described above provides a configuration in which the probe data integration device 14 is configured to change the required number of probe data for performing the integration process for each road section or road link, and the priority in performing the comparison process by the difference comparison device 15 is set. On the other hand, another configuration may be provided to set only one of (i) the required number of probe data and (ii) the priority in performing the comparison process. This also makes it possible to achieve the original object to efficiently process a large amount of probe data.

In addition, the method of setting the required number of probe data for performing the integration process is only examples, including the case using the numerical values. Without need to be limited thereto, various changes can be made. It is also possible to configure the required number not to be changed depending on the number of landmarks or the density of landmarks. Similarly, the priority setting for performing the comparison process may not be limited to the one in which the priority is set in 10 levels. Various changes such as 5 levels can be made. The conditions for changing the priorities are not limited to the above-mentioned seven types of conditions. It is possible to adopt a configuration in which only a part of the conditions is adopted, or to further increase the conditions.

(2) Second Embodiment

Next, a second embodiment will be described with reference to FIGS. 4 and 5. In this second embodiment, the overall configuration of the map generation system 1, the hardware configuration of the data center 2, and the like are common to those of the first embodiment. Therefore, new illustrations and repetitive explanations will be omitted, and the following description will be made focusing on the points different from the first embodiment. Further, in the present embodiment, as a data management unit for integrating/updating map data, meshes that divide a map are used instead of a road section or road link.

Here, with reference to FIG. 5, meshes into which a map is divided as data management units will be described. FIG. 5 shows an example of meshes M into which the area E of the map data is divided vertically and horizontally, that is, in the north-south direction and the east-west direction in a rectangular shape, and the area E includes a road R. Each mesh M can also be called a map tile, and corresponds to a map data of one of different divided areas. Each mesh M has, for example, a square shape of 2 km square. The size of the mesh M can be changed as appropriate, such as 1 km square, or 4 km square. Further, the shape of the mesh M may be a rectangle, a hexagon, a circle, or the like. Each mesh M may be set so as to partially overlap the adjacent mesh M. The size of the mesh M may be different for each layer or each road type.

The difference between the second embodiment and the first embodiment is mainly in the software configuration of the data center 2. That is, the data center 2 includes a communication device 13 as a probe data collection device, a probe data integration device 14 as an integration processing device, a difference comparison device 15 as a comparison processing device, and a map data update device 16. The probe data integration device 14 integrates the probe data collected via the communication device 13 for each mesh M, which is a data management unit, to generate an integrated map data.

In this case, in the first embodiment, the difference comparison device 15 is provided with the comparison process priority setting device 15a. In the present embodiment, instead, the probe data integration device 14, which is an integration processing device, is provided with an integration process priority setting device. As described in the flowchart explanation later, the integrated process priority setting device integrates the collected probe data for each data management unit that is each of the meshes M into which the map is divided. The integrated process priority setting device then sets the priority for performing the integration process when generating an integrated map database. The probe data integration device 14 performs the integration process in descending order of priorities for the respective meshes M set by the integration process priority setting device from the highest priority towards the lowest priority.

Further, suppose a case where while the probe data integration device 14 is performing the integration process for a first mesh M, a second mesh M with a higher priority arises in the other meshes. In such a case, the probe data integration device 14 performs an interrupt process for the second mesh M with the higher priority. Further, as a priority setting method in the integrated process priority setting device, for example, the same method as in the first embodiment is adopted. This is done by raising or lowering the priority value using the above-mentioned seven types of parameters in addition to the road type included in the corresponding mesh M.

Then, the present embodiment does not provide a configuration of providing the required number of probe data for the probe data integration device 14 to perform the integration process. The present embodiment provides a configuration of executing the integration process according to the above priority without checking the degree of collecting the probe data. That is, the determination process in step S1 of FIG. 2 is unconditionally set as an affirmative determination, in other words, the required number of probe data is regarded as one. Note that the required number of probe data for performing the integration process may be set to a constant value, for example, 10 or may be fixedly set.

Figure 4:
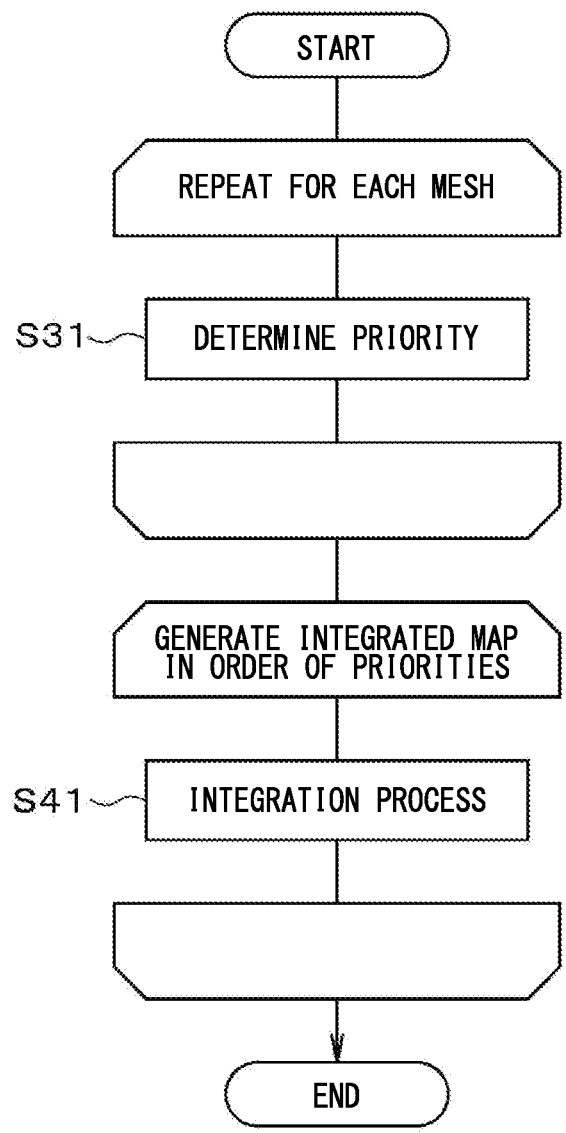
FIG. 4 is a flowchart illustrating steps of processing executed by a probe data integration device according to a second embodiment.
Figure 5:
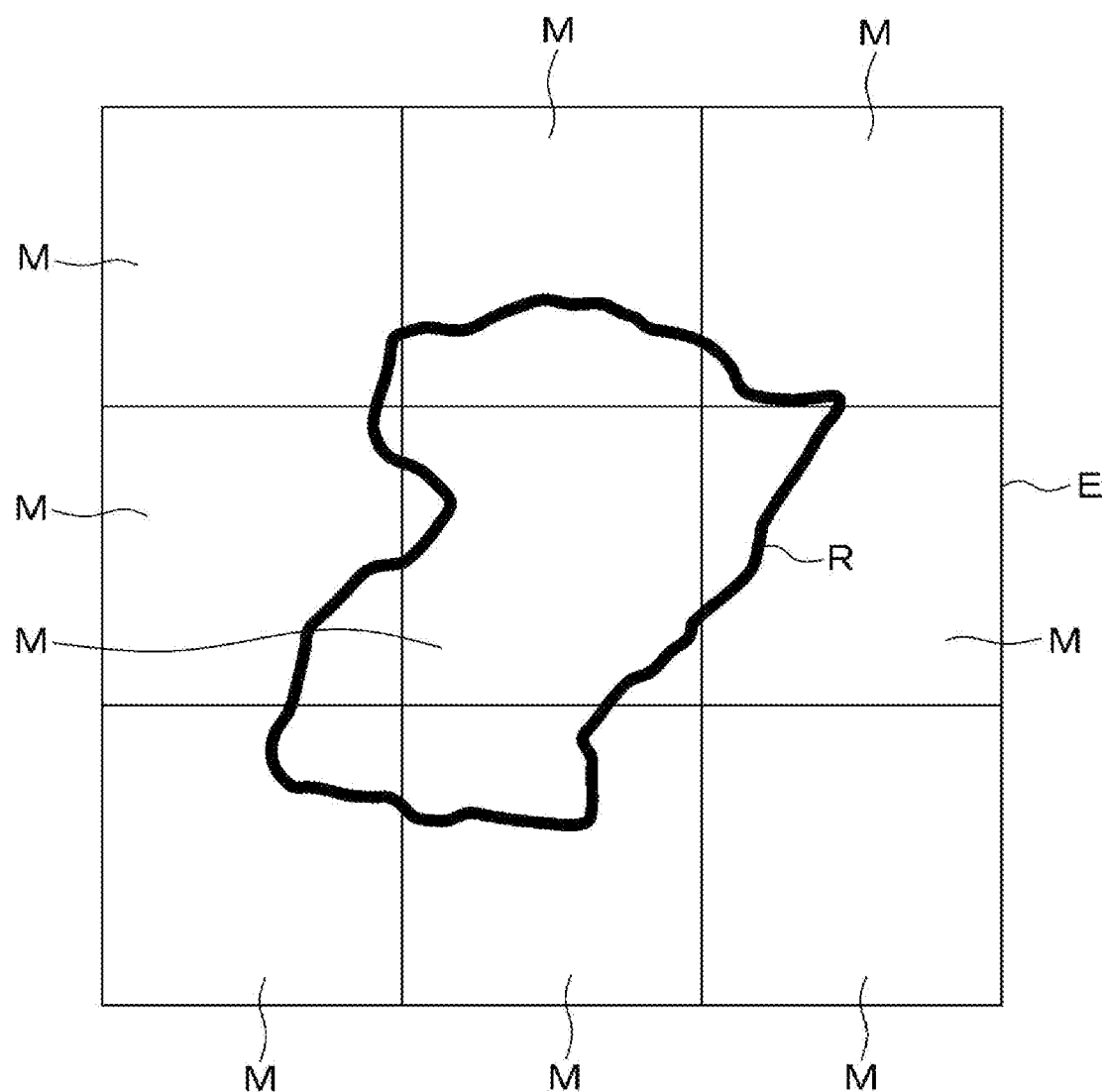
FIG. 5 is a diagram showing an example of meshes as units in data management, the meshes into which a map is divided.

By the way, the flowchart of FIG. 4 schematically shows the steps of the process executed by the probe data integration device 14 in the data center 2 to integrate the probe data and generate the integrated map data. The process of collecting and integrating probe data for all meshes M of nationwide map data is executed, for example, in a cycle of two weeks.

In FIG. 4, first, the processing in step S31 is repeatedly executed for each data management unit served by each of the meshes M into which the map is divided. In step S31, the priority for each mesh M is set to any one of ten levels. Similar to that described in the first embodiment above, the priority is basically set to, for example, priority 2 for a national expressway, priority 4 for a general national highway, etc., according to the road type included in the corresponding mesh M. Further, in the present embodiment, such a basically set priority is changed according to some conditions as follows.

That is, when the time during which the integration process is not performed by the probe data integration device 14 exceeds a predetermined time, for example, one week, the priority is raised by one level. Up to the time when a certain period of time, for example, 48 hours elapses since the integration process was performed by the probe data integration device 14, the priority is lowered by one level. For the mesh M, which includes a road where an accident occurred within a week, the priority is raised by one level. For the mesh M including the road where the automatic driving control has failed, the priority is raised by one level. For the mesh M, which includes a road that is known to have a roadwork, the priority is raised by one level, for example, from one day before the start of the roadwork to the end of the roadwork. For the mesh M, which includes a road existing in an area where a disaster such as earthquake, flood, fire, accident has occurred, the priority is raised by two levels. For the mesh M including a road which receives more than a predetermined number of indications and complaints from the end user that the map is incorrect, the priority is raised by one level.

When the process of setting the priority is completed in this way, the integration process of integrating the probe data in the next step S41 is repeatedly executed for each mesh M in the order of priorities from the unprocessed one. The processing in step S41 is performed by integrating one or more collected probe data. Although not shown, suppose a case where after step S41, the difference comparison device 15 compared the integrated map data with the basic map data to obtain the difference, and further, changes in the data in the mesh M are confirmed. In this case, the map data update device 16 updates the basic map data in the master map database 18.

According to the second embodiment, the following effects can be obtained. That is, the present embodiment provides a configuration where when performing the integration process by the probe data integration device 14, priority is set for each mesh M, which is a data management unit, and the integration process is performed in descending order of priorities. As a result, with respect to the mesh M having a high priority, the frequency in performing the integration process by the probe data integration device 14 can be raised to be relatively high. With respect to the mesh M having a low priority, the frequency of performing the integration process by the probe data integration device 14 can be reduced.

As a result, even in the second embodiment, similarly to the first embodiment, the map data is generated/updated based on the probe data collected from a plurality of vehicles A, and a large amount of data is generated. It is possible to obtain an excellent effect that the probe data can be processed efficiently. Further, in particular, in the present embodiment, the required number of probe data is not set for each road type and the degree of collecting the probe data is not confirmed; when one or more probe data are collected, the integration process is executed according to the priority.

Here, suppose a road having a plurality of lanes, for example, three lanes on each direction. In such a road, even if the required number of probe data, for example, 10 is collected, a situation may occur in which the required number of probe data is not available for all lanes when viewed for each lane. In such a case, it may not be possible to know whether or not the required number of probe data for all lanes are available until the probe data integration process is performed once. However, in the present embodiment, since the integrated process is executed from the mesh having a high priority, it is possible to prevent the occurrence of such a problem.

In the second embodiment, the mesh M, which is a data management unit, has a square shape of, for example, 2 km square, but the size and shape of the mesh M may be non-uniform. For example, the mesh M in a rural area where the presence density of map elements such as landmarks is relatively sparse may be set larger than the mesh M in an urban area where the map elements are densely present. For example, the mesh M in the rural area may have a rectangular shape of 4 km square, while the mesh M in the urban area may have a rectangular shape of 1 km or 0.5 km square. The urban area here refers to, for example, an area where the population density is equal to or larger than a predetermined value or an area where offices and commercial facilities are concentrated. The rural area may be an area other than the urban areas.

In addition, the distribution mode of all map data may be defined by the data size. In other words, the map recording area may be divided and managed within a range defined by the data size. In that case, each mesh M is set so that the amount of data is less than a predetermined value based on the number or density of landmarks. According to such an aspect, the data size in one delivery can be set to a certain value or less. It is assumed that the real space range corresponding to the mesh M in the urban area is narrower than the real space range corresponding to the mesh M in the rural area. As mentioned above, it is expected that map elements such as landmarks or lane marks will be more densely present in urban areas than in rural areas.

Further, even in the second embodiment, the conditions for changing the priority in performing the integration process are not limited to the above-mentioned seven types of conditions, and it is possible to adopt a configuration in which only a part of the conditions is adopted, or to further increase the conditions. As a condition for performing the integration process, it may be adopted that the required number of probe data has been collected for each road type. Further, in the second embodiment, a road section or road link may be adopted as a data management unit. In the first embodiment, the data management unit may be configured to employ meshes into which a map is divided.

In addition, the configuration of the in-vehicle apparatus 3 and the vehicle A, the hardware configuration and the software configuration in the data center 2, and the like can be variously changed and implemented. Although the present disclosure has been described in accordance with the examples, it is understood that the present disclosure is not limited to the examples and structures. The present disclosure also includes various modifications and modifications within a uniform range. In addition, various combinations and configurations, as well as other combinations and configurations that include only one element, more, or less, are within the scope and spirit of the present disclosure.

As described above, the input device 4, the recording device 5, and the travel control device 9 may be included in a controller included in the computer in the in-vehicle apparatus 3. Further, the probe data integration device 14, the difference comparison device 15, and the map data update device 16 may be included in a controller included in the sever computer in the data center 2. Those controllers and methods thereof described in the present disclosure may be implemented by one or more than one special-purpose computer. Such a computer may be created (i) by configuring (a) a memory and a processor programmed to execute one or more particular functions embodied in computer programs, or (ii) by configuring (b) a processor provided by one or more special purpose hardware logic circuits, or (iii) by configuring a combination of (a) a memory and a processor programmed to execute one or more particular functions embodied in computer programs and (b) a processor provided by one or more special purpose hardware logic circuits. The computer program may be stored, as an instruction executed by a computer, in a computer-readable non-transitory tangible storage medium.

For reference to further explain features of the present disclosure, the description is added as follows.

For example, as a technology for generating a digital road map used for a car navigation apparatus or automatic driving control, a system that generates/updates map data based on probe data collected from a plurality of probe cars can be considered. In this system, a plurality of vehicles, which are probe cars, are communicably connected to the center, and the center collects, as probe data, vehicle traveling position data obtained over time from GPS as each vehicle travels. Then, the center reproduces the traveling locus of each road from the probe data and updates the map data based on the difference detected from the map data in the database.

In the above system, a huge amount of probe data can be collected by expanding the probe car that transmits probe data to not only dedicated vehicles but also general vehicles. This makes it possible to obtain highly accurate map data over a wide range. In the near future, the number of probe cars is expected to reach millions. How to efficiently use the large amount of probe data collected from these probe cars to update the map data becomes an important issue.

It is thus desired for the present disclosure to provide a map generation apparatus that generates and updates map data based on probe data collected from a plurality of vehicles to efficiently process a large amount of probe data.

Aspects of the present disclosure described herein are set forth in the following clauses.

According to a first aspect of the present disclosure, a map data generation apparatus is provided to include: a probe data collection device; an integration processing device; a comparison processing device; and a map data update device. The probe data collection device is configured to collect probe data from a plurality of vehicles. The integration processing device is configured to perform an integration process to generate an integrated map data by integrating the probe data collected by the probe data collection device for each of data management units corresponding to (i) road sections, (ii) road links, or (iii) meshes into which a map is divided. The comparison processing device is configured to perform a comparison process to obtain a difference by comparing the integrated map data generated by the integration processing device with a basic map data. The map data update device is configured to update the basic map data based on the difference obtained by the comparison processing device. Herein, the integration processing device is further configured to generate the integrated map data for a first data management unit of the data management units in response to a required number of the probe data being collected for the first data management unit. The required number of the probe data is set depending on a road type in the first data management unit.

According to the first aspect, when the probe data collection device collects probe data from a plurality of vehicles, the integration processing device performs an integration process of integrating the plurality of probe data to generate an integrated map data. Next, the comparison processing device compares the integrated map data with the basic map data to obtain a difference, and the map data updating device updates the basic map data based on the obtained difference.

The integration processing device generates the integrated map data in response to a required number of the probe data being collected for each of the data management units corresponding to (i) road sections, (ii) road links, or (iii) meshes into which a map is divided. The required number of the probe data is set for a road type in the corresponding data management unit. Therefore, a data management unit with a relatively small required number has a relatively high frequency in performing (i) the integration process and (ii) the subsequent comparison process; in contrast, a data management unit with a relatively large required number has a relatively low frequency in performing (i) the integration process and (ii) the subsequent comparison process. As a result, the map data is generated/updated based on the probe data collected from a plurality of vehicles, and a large amount of probe data can be efficiently processed.

According to a second aspect of the present disclosure, a map data generation apparatus is provided to include: a probe data collection device; an integration processing device; a comparison processing device; a map data update device; and a comparison process priority setting device. The probe data collection device is configured to collect probe data from a plurality of vehicles. The integration processing device is configured to perform an integration process to generate an integrated map data by integrating the probe data collected by the probe data collection device for each of data management units corresponding to (i) road sections, (ii) road links, or (iii) meshes into which a map is divided. The comparison processing device is configured to perform a comparison process to obtain a difference by comparing the integrated map data generated by the integration processing device with a basic map data. The map data update device is configured to update the basic map data based on the difference obtained by the comparison processing device. The comparison process priority setting device is configured to set priorities respectively for the data management units in the comparison process performed by the comparison processing device. Herein, the comparison processing device is further configured to perform the comparison process to obtain the difference for each of the data management units in descending order of the priorities respectively set for the data management units.

According to the second aspect, the comparison process priority setting device sets the priorities for the comparison process by the comparison processing device for each of the data management units, and the comparison processing device performs the comparison processing in descending order of the priorities. Therefore, a data management unit with a high priority has a relatively high frequency in the comparison process by the comparison processing device; in contrast, a data management unit with a low priority has a relatively low frequency in the comparison process by the comparison processing device. As a result, the map data is generated/updated based on the probe data collected from a plurality of vehicles, and a large amount of probe data can be efficiently processed.

According to a third aspect of the present disclosure, a map data generation apparatus is provided to include: a probe data collection device; an integration processing device; a comparison processing device; a map data update device; and an integration process priority setting device. The probe data collection device is configured to collect probe data from a plurality of vehicles. The integration processing device is configured to perform an integration process to generate an integrated map data by integrating the probe data collected by the probe data collection device for each of data management units corresponding to (i) road sections, (ii) road links, or (iii) meshes into which a map is divided. The comparison processing device is configured to perform a comparison process to obtain a difference by comparing the integrated map data generated by the integration processing device with a basic map data. The map data update device is configured to update the basic map data based on the difference obtained by the comparison processing device. The integration process priority setting device is configured to set priorities respectively for the data management units in the integration process performed by the integration processing device. Herein, the integration processing device is further configured to perform the integration process for each of the data management units in descending order of the priorities respectively set for the data management units.

According to the third aspect, the integration process priority setting device sets the priorities for integration process by the integration processing device for each of the data management units, and the integration processing device integrates the data in descending order of the priorities. Therefore, a data management unit with a high priority has a relatively high frequency in the integration process by the integration processing device; in contrast, a data management unit with a low priority has a relatively low frequency in the integration process by the integration processing device. As a result, the map data is generated/updated based on the probe data collected from a plurality of vehicles, and a large amount of probe data can be efficiently processed.

What is claimed is:

1. A map data generation apparatus comprising:
a probe data collection device configured to collect probe data from a plurality of vehicles;
an integration processing device configured to perform an integration process to generate an integrated map data by integrating the probe data collected by the probe data collection device for each of data management units corresponding to (i) road sections, (ii) road links, or (iii) meshes into which a map is divided;
a comparison processing device configured to perform a comparison process to obtain a difference by comparing the integrated map data generated by the integration processing device with a basic map data; and
a map data update device configured to update the basic map data based on the difference obtained by the comparison processing device,
wherein:
the integration processing device is further configured to generate the integrated map data for a first data management unit of the data management units in response to a required number of the probe data being collected for the first data management unit, the required number of the probe data being set depending on a road type in the first data management unit.

2. The map data generation apparatus according to claim 1, wherein:
the required number of the probe data collected for the first data management unit varies depending on a total number of landmarks or a density of landmarks in the first data management unit.

3. The map data generation apparatus according to claim 1, further comprising:
a transceiver configured to serve as the probe data collection device to collect the probe data from the plurality of vehicles; and
one or more processors communicably connected to the transceiver, the one or more processors being configure to implement the integration processing device, the comparison processing device, and the map data update device.

4. A map data generation apparatus comprising:
a probe data collection device configured to collect probe data from a plurality of vehicles;
an integration processing device configured to perform an integration process to generate an integrated map data by integrating the probe data collected by the probe data collection device for each of data management units corresponding to (i) road sections, (ii) road links, or (iii) meshes into which a map is divided;
a comparison processing device configured to perform a comparison process to obtain a difference by comparing the integrated map data generated by the integration processing device with a basic map data;
a map data update device configured to update the basic map data based on the difference obtained by the comparison processing device; and
a comparison process priority setting device configured to set priorities respectively for the data management units in the comparison process performed by the comparison processing device,
wherein:
the comparison processing device is further configured to perform the comparison process to obtain the difference for each of the data management units in descending order of the priorities respectively set for the data management units.

5. The map data generation apparatus according to claim 4, wherein:
the comparison process priority setting device is further configured to set the priority for a first data management unit of the data management units according to a road type in the first data management unit.

6. The map data generation apparatus according to claim 4, wherein:
the comparison process priority setting device is further configured to raise the priority for a first data management unit of the data management units in response to a predetermined period of time elapsing while the comparison process by the comparison processing device is not performed to the first data management unit.

7. The map data generation apparatus according to claim 4, wherein:
the comparison process priority setting device is further configured to lower the priority for a first data management unit of the data management units up to a time when a predetermined period of time elapses since the comparison process by the comparison processing device is performed to the first data management unit.

8. The map data generation apparatus according to claim 4, wherein:
the comparison process priority setting device is further configured to raise the priority for a first data management unit of the data management units in which an accident has occurred.

9. The map data generation apparatus according to claim 4, wherein:
the comparison process priority setting device is further configured to raise the priority for a first data management unit of the data management units in which a failure in an automatic driving control has occurred.

10. The map data generation apparatus according to claim 4, wherein:
the comparison process priority setting device is further configured to raise the priority for a first data management unit of the data management units in which a roadwork is determined to be carried out.

11. The map data generation apparatus according to claim 4, wherein:
the comparison process priority setting device is further configured to raise the priority for a first data management unit of the data management units that exists in an area that has undergone a disaster.

12. The map data generation apparatus according to claim 4, wherein:
in response to a second data management unit of the data management units with a second priority arising during performing the comparison process to a first data management unit of the data management units with a first priority lower than the second priority, the comparison processing device is further configured to perform an interrupt process for the second data management unit by interrupting the comparison process to the first data management unit.

13. The map data generation apparatus according to claim 4, further comprising:
a transceiver configured to serve as the probe data collection device to collect the probe data from the plurality of vehicles; and one or more processors communicably connected to the transceiver, the one or more processors being configure to implement the integration processing device, the comparison processing device, the map data update device, and the comparison process priority setting device.

14. A map data generation apparatus, comprising:
a probe data collection device configured to collect probe data from a plurality of vehicles;
an integration processing device configured to perform an integration process to generate an integrated map data by integrating the probe data collected by the probe data collection device for each of data management units corresponding to (i) road sections, (ii) road links, or (iii) meshes into which a map is divided;
a comparison processing device configured to perform a comparison process to obtain a difference by comparing the integrated map data generated by the integration processing device with a basic map data;
a map data update device configured to update the basic map data based on the difference obtained by the comparison processing device; and
an integration process priority setting device configured to set priorities respectively for the data management units in the integration process performed by the integration processing device,
wherein:
the integration processing device is further configured to perform the integration process for each of the data management units in descending order of the priorities respectively set for the data management units.

15. The map data generation apparatus according to claim 14, wherein:
the integration process priority setting device is further configured to set the priority for a first data management unit of the data management units according to a road type in the first data management unit.

16. The map data generation apparatus according to claim 14, wherein:
the integration process priority setting device is further configured to raise the priority for a first data management unit of the data management units in response to a predetermined period of time elapsing while the integration process by the integration processing device is not performed to the first data management unit.

17. The map data generation apparatus according to claim 14, wherein:
the integration process priority setting device is further configured to lower the priority for a first data management unit of the data management units up to a time when a predetermined period of time elapses since the integration process by the integration processing device is performed to the first data management unit.

18. The map data generation apparatus according to claim 14, wherein:
the integration process priority setting device is further configured to raise the priority for a first data management unit of the data management units in which an accident has occurred.

19. The map data generation apparatus according to claim 14, wherein:
the integration process priority setting device is further configured to raise the priority for a first data management unit of the data management units in which a failure in an automatic driving control has occurred.

20. The map data generation apparatus according to claim 14, wherein:
the integration process priority setting device is further configured to raise the priority for a first data management unit of the data management units in which a roadwork is determined to be carried out.

21. The map data generation apparatus according to claim 14, wherein:
the integration process priority setting device is further configured to raise the priority for a first data management unit of the data management units that exists in an area that has undergone a disaster.

22. The map data generation apparatus according to claim 14, wherein:
in response to a second data management unit of the data management units with a second priority arising during performing the integration process to a first data management unit of the data management units with a first priority lower than the second priority, the integration processing device is further configured to perform an interrupt process for the second data management unit by interrupting the integration process to the first data management unit.

23. The map data generation apparatus according to claim 14, further comprising:
a transceiver configured to serve as the probe data collection device to collect the probe data from the plurality of vehicles; and
one or more processors communicably connected to the transceiver, the one or more processors being configure to implement the integration processing device, the comparison processing device, the map data update device, and the integration process priority setting device.

* * * * *